United States Patent
Chu et al.

(10) Patent No.: US 10,710,066 B2
(45) Date of Patent: Jul. 14, 2020

(54) AUTOMATIC PIPETTING APPARATUS AND PIPETTING MODULE

(71) Applicant: Wistron Corporation, New Taipei (TW)

(72) Inventors: Yu-Jung Chu, New Taipei (TW); Chen-An Sung, New Taipei (TW)

(73) Assignee: Wistron Corporation, New Taipei (TW)

( * ) Notice: Subject to any disclaimer, the term of this patent is extended or adjusted under 35 U.S.C. 154(b) by 93 days.

(21) Appl. No.: 15/825,119

(22) Filed: Nov. 29, 2017

(65) Prior Publication Data

US 2019/0083968 A1  Mar. 21, 2019

(30) Foreign Application Priority Data

Sep. 21, 2017  (TW) .............................. 106132405 A

(51) Int. Cl.
 *B01L 3/02* (2006.01)
 *B01L 9/00* (2006.01)
 (Continued)

(52) U.S. Cl.
 CPC ............. *B01L 3/021* (2013.01); *B01L 3/0275* (2013.01); *B01L 3/0279* (2013.01); *B01L 9/54* (2013.01); *G01N 1/10* (2013.01); *G01N 27/44743* (2013.01); *G01N 35/10* (2013.01); B01L 9/543 (2013.01); B01L 2200/0689 (2013.01); B01L 2200/143 (2013.01); B01L 2200/146 (2013.01); B01L 2200/147 (2013.01); B01L 2300/1827 (2013.01); G01N 35/00613 (2013.01); G01N 2001/1062 (2013.01);
 (Continued)

(58) Field of Classification Search
 CPC ...... B01L 3/021; B01L 9/54; B01L 2200/143; G01N 1/10; G01N 27/44743; G01N 35/10; G01N 35/00613; G01N 2001/1062; G01N 2035/00425; G01N 2035/103
 See application file for complete search history.

(56) References Cited

U.S. PATENT DOCUMENTS 3,883,044 A * 5/1975 Buchler ................ B01L 3/0234
 222/309
6,396,584 B1 5/2002 Taguchi et al.
 (Continued)

FOREIGN PATENT DOCUMENTS

WO 2008128864 10/2008

OTHER PUBLICATIONS

InspectAPedia ("Table of Coefficient of Expansion of Building Materials", pp. 1-11, 2018) (Year: 2018).*

(Continued)

*Primary Examiner* — Suman K Nath
(74) *Attorney, Agent, or Firm* — JCIPRNET

(57) ABSTRACT

A pipetting module includes a pipette head and a pipette tip. The pipette head has a first coefficient of thermal expansion. The pipette tip includes a connecting portion. The connecting portion is adapted to be sleeved on the pipette head, and the connecting portion has a second coefficient of thermal expansion. The second coefficient of thermal expansion of the connecting portion is greater than the first coefficient of thermal expansion of the pipette head. In addition, an automatic pipetting apparatus is also provided.

10 Claims, 5 Drawing Sheets

(51) Int. Cl.
 G01N 27/447 (2006.01)
 G01N 1/10 (2006.01)
 G01N 35/10 (2006.01)
 G01N 35/00 (2006.01)

(52) U.S. Cl.
 CPC .............. *G01N 2035/00425* (2013.01); *G01N 2035/00524* (2013.01); *G01N 2035/103* (2013.01)

(56) References Cited

U.S. PATENT DOCUMENTS

| | | |
|---|---|---|
| 7,335,337 B1 | 2/2008 | Smith |
| 2002/0022016 A1* | 2/2002 | Walsh .................. A61K 9/1652 424/93.1 |
| 2008/0085329 A1* | 4/2008 | Roth .................... A61K 31/095 424/701 |
| 2009/0232704 A1* | 9/2009 | Dohmae ............ G01N 35/0092 422/63 |
| 2011/0107855 A1* | 5/2011 | Motadel ................ B01L 3/0248 73/863.21 |
| 2013/0045498 A1* | 2/2013 | Abel ...................... B01L 3/021 435/15 |
| 2013/0130369 A1* | 5/2013 | Wilson .................. G16B 99/00 435/289.1 |
| 2013/0344587 A1* | 12/2013 | Nakayama ............. C12M 23/12 435/297.1 |

OTHER PUBLICATIONS

"Office Action of Taiwan Counterpart Application", dated Dec. 10, 2018, p. 1-p. 6.

\* cited by examiner

AUTOMATIC PIPETTING APPARATUS AND PIPETTING MODULE

CROSS-REFERENCE TO RELATED APPLICATION

This application claims the priority benefit of Taiwan application serial no. 106132405, filed on Sep. 21, 2017. The entirety of the above-mentioned patent application is hereby incorporated by reference herein and made a part of this specification.

BACKGROUND OF THE INVENTION

1. Field of the Invention

The invention relates to an automatic pipetting apparatus. More particularly, the invention relates to a pipetting module capable of accommodating thermal expansion and contraction and an automatic pipetting apparatus applying the pipetting module.

2. Description of Related Art

With advances in biological technology, reactions mixing reagents with samples become frequently employed by increasing numbers of biological-related laboratories or hospitals and even in forensic examinations, etc., so as to carry out experiments or inspection. As such, fully automated pipetting machines or equipment may deliver convenient and rapid operations for laboratory personnel, and moreover, a large number and clean testing reactions may be completed in a short period of time, and efficiency of examinations is thereby enhanced.

In a conventional pipette head, a protruding structure or groove on the pipette head is used together with an O-ring structure to be engaged and combined with a commercially-available pipette tip. Nevertheless, dimensional accuracy of the commercially-available pipette tips is inconsistent due to differences in design from various manufactures and unstable product quality. Consequently, tolerances exist among batches of the pipette tips or among the pipette tips. Therefore, it is difficult for the pipette heads to be designed to be adapted to all of the pipette tips in the market. Moreover, the tolerance problem may lead to incomplete tightness, customized pipette tips are thereby adopted corresponding to various pipette models provided by the manufacturers. In addition, the groove on the pipette head with the O-ring structure is susceptible to be abraded and then deteriorated after a period of time. The O-ring thus has to be replaced and tightness between the pipette tip and the pipette head has to be verified, repair time is thereby considerably increased, leading to increases in costs and decreases in efficiency of examinations.

SUMMARY OF THE INVENTION

The invention provides a pipetting module having favorable tightness effect between a pipette head and a pipette tip thereof.

The invention further provides an automatic pipetting apparatus having favorable tightness effect between a pipette head and a pipette tip thereof. Moreover, the pipette head is prevented from being worn out, and repair time is thereby reduced, as such, advantages such as cost reduction and inspection efficiency enhancement are achieved.

In an embodiment of the invention, an automatic pipetting method is provided, in which favorable tightness effect is achieved between a pipette head and a pipette tip thereof. Moreover, the pipette head is prevented from being worn out, and repair time is thereby reduced, as such, advantages such as cost reduction and inspection efficiency enhancement are achieved.

In an embodiment of the invention, a pipetting module includes a pipette head and a pipette tip. The pipette head has a first coefficient of thermal expansion. The pipette tip includes a connecting portion adapted to be sleeved on the pipette head. The connecting portion has a second coefficient of thermal expansion. The second coefficient of thermal expansion of the connecting portion is greater than the first coefficient of thermal expansion of the pipette head.

In an embodiment of the invention, a material of the pipette tip includes polymethylmethacrylate, polypropylene, or polyethylene, and a material of the pipette head includes ceramics or glass.

In an embodiment of the invention, the pipetting module further includes a sensor disposed on the pipette head. The sensor is a temperature sensor or a pressure sensor.

The automatic pipetting apparatus provided by the embodiments of the invention includes a pipette tip pre-cooling station, a pipette tip recycling station, a movable pipetting mechanism, and a pipette tip. The pipette tip pre-cooling station includes a cooling device. The movable pipetting mechanism includes a pipette head and a movement mechanism. The pipette head has a first coefficient of thermal expansion, and the pipette head is disposed in the movement mechanism. The movement mechanism is adapted to move between the pipette tip pre-cooling station and the pipette tip recycling station. The pipette tip includes a connecting portion, and the connecting portion is adapted to be sleeved on the pipette head. The connecting portion has a second coefficient of thermal expansion. The second coefficient of thermal expansion of the connecting portion is greater than the first coefficient of thermal expansion of the pipette head.

In an embodiment of the invention, the pipette tip pre-cooling station includes a tray, and the tray is adapted to carry the pipette tip.

In an embodiment of the invention, the pipette tip is adapted to be combined with the pipette head at the pipette tip pre-cooling station, to be moved together with the pipette head to the pipette tip recycling station, and to be detached from the pipette head.

In an embodiment of the invention, the pipette tip recycling station includes an upper pre-heating station and a lower waste station, and the upper pre-heating station includes a heating module.

In an embodiment of the invention, the upper pre-heating station further includes an infrared sensor.

In an embodiment of the invention, a material of the pipette tip structure includes polymethylmethacrylate, polypropylene, or polyethylene, and a material of the pipette head includes ceramics or glass.

In an embodiment of the invention, the movable pipetting mechanism further includes a sensor disposed on the pipette head. The sensor is a temperature sensor or a pressure sensor.

In an embodiment of the invention, the automatic pipetting method includes (A) enabling a pipette head to be sleeved on a connecting portion of a pipette tip, the pipette head having a first coefficient of thermal expansion, the connecting portion having a second coefficient of thermal expansion, and the second coefficient of thermal expansion of the connecting portion being greater than the first coefficient of thermal expansion of the pipette head; (B) performing temperature decrease to the connecting portion of the pipette tip as such a volume of the connecting portion is contracted and is tightly fitted to the pipette head; (C) moving the pipette head and enabling the connecting portion to be tightly fitted to the pipette tip of the pipette head; and (D) performing temperature increase to the connecting portion of the pipette tip as such the volume of the connecting portion is expanded and is detached from the pipette head.

In an embodiment of the invention, in the step (B) of performing temperature decrease to the connecting portion of the pipette tip, a temperature decrease range falls between 25° C. and 57° C.

In an embodiment of the invention, in the step (D) of performing temperature increase to the connecting portion of the pipette tip, a temperature increase range falls between 25° C. and 57° C.

In an embodiment of the invention, a material of the pipette tip includes polymethylmethacrylate, polypropylene, or polyethylene, and a material of the pipette head includes ceramics or glass.

In an embodiment of the invention, after performing temperature decrease of step (B) to the connecting portion of the pipette tip, a temperature of the connecting portion of the pipette after being decreased is detected, or a pressure applying to the pipette head by the connecting portion after temperature decrease is detected.

In an embodiment of the invention, after performing temperature increase of step (D) to the connecting portion of the pipette tip, whether the pipette tip is detached from the pipette head is detected.

Based on the above, in the pipetting module and the automatic pipetting apparatus of the embodiments of the invention, the second coefficient of thermal expansion of the connecting portion of the pipette tip is greater than the first coefficient of thermal expansion of the pipette head, as such, the deformation of the connecting portion sleeved onto the pipette head is relatively greater than the deformation of the pipette head generated under the same temperature difference ranges. In this way, in the pipetting module, the connecting portion of the pipette tip may be contracted and tightly fitted to the pipette head through adjusting temperature changes. Alternatively, the connecting portion of the pipette tip may be expanded and detached from the pipette head through temperature increase. As such, the pipette tip is prevented from being unable to achieve tightness owing to the dimensional tolerance. In addition, when being installed on or removed from the pipette head, no abrasion nor deterioration to the pipette head is to be caused by the pipette tip as the pipette tip is expanded or contracted by means of temperature changes. The pipette head is prevented from being worn out, verification time after repair is also prevented, and repair time is thereby significantly reduced, as such, requirements for cost reduction and high inspection efficiency are therefore achieved.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
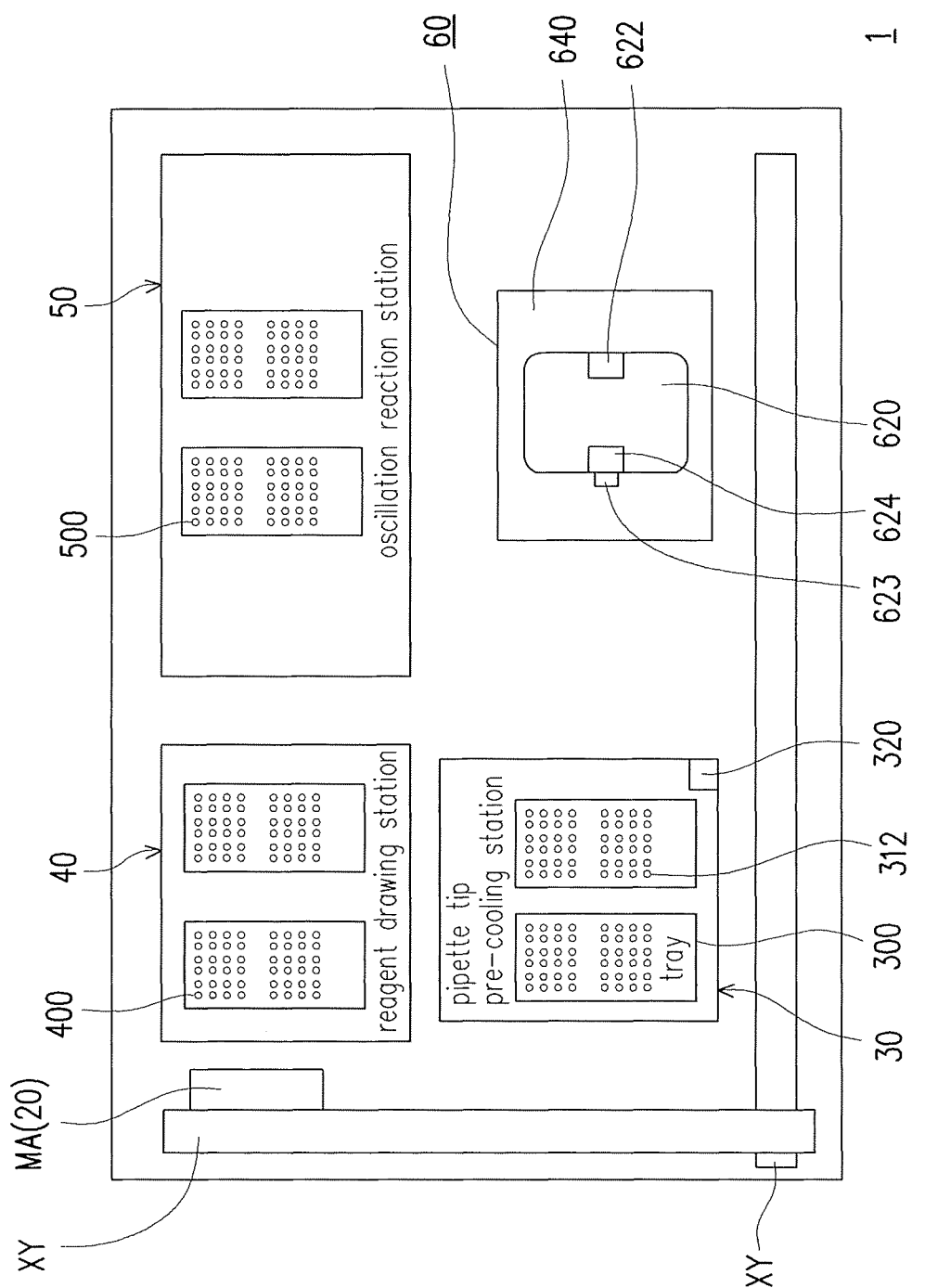
FIG. 1 is a top view illustrating an automatic pipetting apparatus according to an embodiment of the invention.
Figure 2:
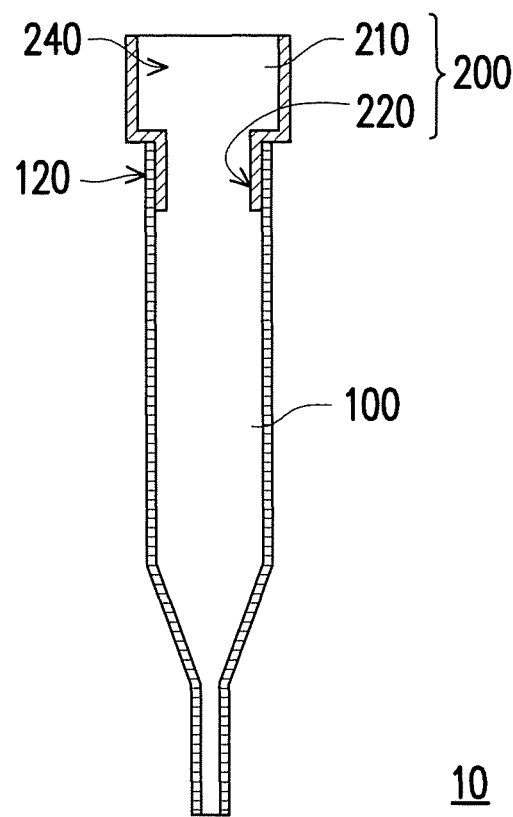
FIG. 2 is a schematic cross-sectional view illustrating a pipetting module according to an embodiment of the invention.
Figure 3:
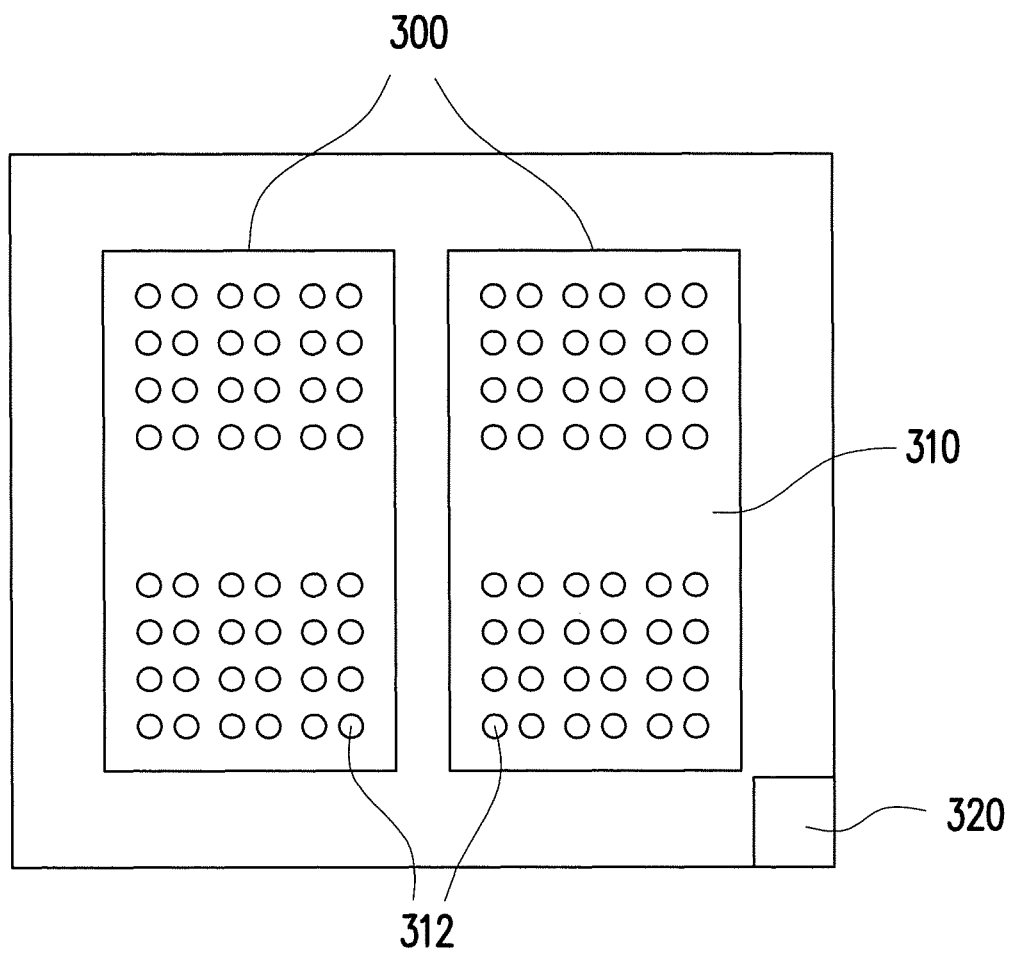
FIG. 3 is an enlarged top view illustrating a pipette tip pre-cooling station of the automatic pipetting apparatus of FIG. 1.
Figure 4:
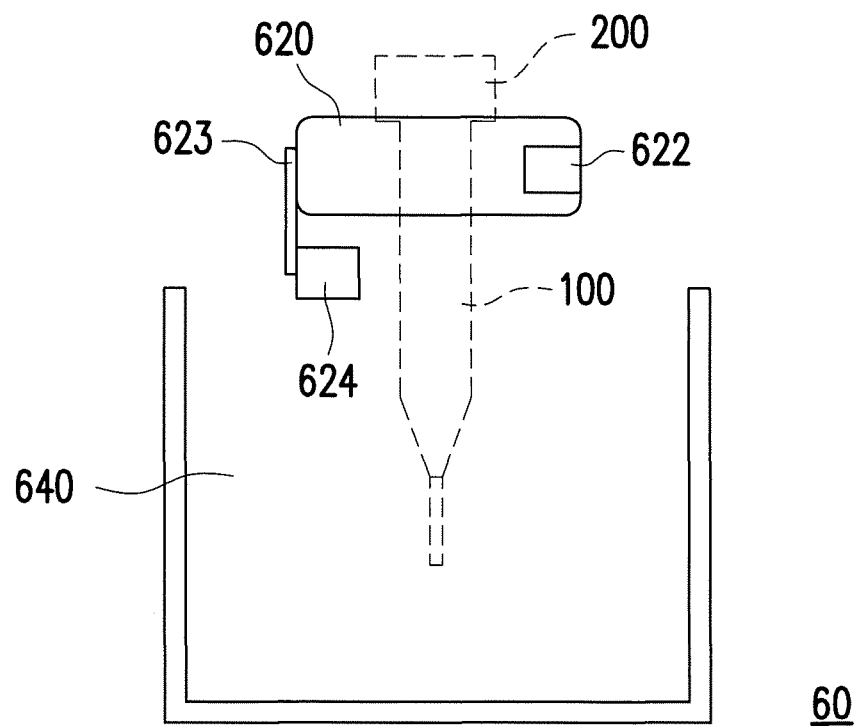
FIG. 4 is a schematic cross-sectional view illustrating a pipette tip recycling station of the automatic pipetting apparatus of FIG. 1.

FIG. 1 is a top view illustrating an automatic pipetting apparatus according to an embodiment of the invention. FIG. 2 is a schematic cross-sectional view illustrating a pipetting module according to an embodiment of the invention. FIG. 3 is an enlarged top view illustrating a pipette tip pre-cooling station of the automatic pipetting apparatus of FIG. 1. FIG. 4 is a schematic cross-sectional view illustrating a pipette tip recycling station of the automatic pipetting apparatus of FIG. 1. Referring to FIG. 1, an automatic pipetting apparatus 1 provided by the present embodiment includes a pipette tip pre-cooling station 30, a reagent drawing station 40, an oscillation reaction station 50, a pipette tip recycling station 60, a movable pipetting mechanism 20, and a pipette tip 100. Note that relative positions of each of the elements in the automatic pipetting apparatus illustrated in FIG. 1 are merely schematically and simply illustrated for reference only, and actual numbers and dimension ratios thereof are not similar to those shown in FIG. 1. Similarly, each of the elements in the side view and the schematic cross-sectional view of the pipetting module illustrated in FIG. 2 are merely schematically and simply illustrated and enlarged, and actual dimension ratios thereof are not similar to those shown in FIG. 2.

Specifically, the movable pipetting mechanism 20 of the automatic pipetting apparatus 1 of the present embodiment includes a pipette head 200 (not shown) and a movement mechanism MA. The pipette head 200 is disposed on the movement mechanism MA. The movement mechanism MA is adapted to move among the pipette tip pre-cooling station 30, the reagent drawing station 40, the oscillation reaction station 50, or the pipette tip recycling station 60 through a track XY. In other words, the movement mechanism MA may be an automatic mechanical arm in a fully automated machine and is capable of moving the pipette head 200 back and forth among different stations according to user operation or pre-entered programs. In addition, the invention is not intended to limit orders and number of times of moving the pipette head 200 among different stations by the movement mechanism MA, and the orders and number of times may be adjusted as required.

Next, FIG. 1 is referred together with FIG. 2. Referring to FIG. 2 first, in the automatic pipetting apparatus 1 (not shown) of the present embodiment, the pipette tip 100 includes a connecting portion 120, wherein the connecting portion 120 is adapted to be sleeved on the pipette head 200. In other words, the pipette head 200 of the present embodiment includes a base portion 210 and a protruding portion 220. The protruding portion 220 may be tightly fitted to and combined with the connecting portion 120 of the pipette tip 100, and a pipetting module 10 is thereby formed. Specifically, the pipette head 200 has a first coefficient of thermal expansion CT1, and the connecting portion 120 of the pipette tip 100 has a second coefficient of thermal expansion CT2. Herein, the second coefficient of thermal expansion CT2 of the connecting portion 120 is greater than the first coefficient of thermal expansion CT1 of the pipette head 200. Note that the invention is not intended to limit the coefficient of thermal expansion of the connecting portion 120 to be greater than the first coefficient of thermal expansion CT1 of the pipette head 200 only at the pipette tip 100. In other embodiments, a portion of the pipette tip 100 not being located at the connecting portion 120 may has a coefficient of thermal expansion greater than the first coefficient of thermal expansion CT1 of the pipette head 200, as long as the coefficient of thermal expansion of the pipette tip is greater than the coefficient of thermal expansion of the pipette head and a difference value exists therebetween.

Specifically, thermal expansion and contraction is a phenomenon in which identical matters to change in dimension in response to a change in temperature. The coefficient of thermal expansion (CTE) holds the key to determine the expansion or contraction of matters. Comparing between a material with a high coefficient of thermal expansion and a material with a low coefficient of thermal expansion, the thermal expansion phenomenon of the material with a high coefficient of thermal expansion is more evident than the material with a low coefficient of thermal expansion. Therefore, the material with a high coefficient of thermal expansion has a greater degree of dimension deformation compared to the material with a low coefficient of thermal expansion under identical temperature differences. Specifically, in identical temperature difference ranges, a degree of deformation of the pipette tip 100 with a relatively high coefficient of thermal expansion may be greater than a degree of deformation of the pipette head 200 with a relatively low coefficient of thermal expansion. Therefore, the dimension of the pipette tip 100 may be adjusted through the deformation caused by the temperature differences, so as to decrease an influence brought by tolerances generated in a process. Further, the pipette tip 100 may be sleeved on the pipette head 200 so as to be tightly fitted to or to be detached from the pipette head 200.

Generally, a dimensional tolerance generated when the pipette tip is manufactured is approximately 0 mm to 0.01 mm, and a dimensional tolerance of a conventional O-ring disposed on the pipette head is approximately 0 mm to 0.05 mm. Specifically, when the pipette tip and the pipette head are heated, if a degree of change in dimension difference is not greater than a dimensional tolerance between the two, the pipette tip can still not be effectively tightly fitted to or combined with the pipette head. To be more specifically, in the first embodiment, a difference value between the first coefficient of thermal expansion CT1 of the pipette head 200 and the second coefficient of thermal expansion CT2 of the connecting portion is $1.12 \times 10^{-4}$ $k^{-1}$ (CT1 is, for example, glass having a coefficient of thermal expansion of $8.5 \times 10^{-6}$ $k^{-1}$, and CT2 is polypropylene having a coefficient of thermal expansion of $1.21 \times 10^{-4}$ $k^{-1}$). In the present embodiment, the difference value between the coefficients of thermal expansion allows the dimension difference between the pipette tip 100 and the pipette head 200 may reach 0.05 mm simply by means of temperature increase and temperature decrease. Therefore, in the embodiments of the invention, a difference value range of the coefficient of thermal expansion between the first coefficient of thermal expansion CT1 and the second coefficient of thermal expansion CT2 allows both the pipette head 200 and the pipette tip 100 to achieve favorable tightness effectively through thermal expansion and contraction whether or not by employing the conventional trench structure or the O-ring structure in the pipetting module 10.

TABLE 1

| Material | Coefficient of Thermal Expansion ($k^{-1}$) | Temperature Difference (° C.)$^a$ | Dimension Difference (mm) |
|---|---|---|---|
| PMMA | $88 \times 10^{-6}$ | 56.81 | 0.05 |
| PP | $121 \times 10^{-6}$ | 41.32 | 0.05 |
| PE | $200 \times 10^{-6}$ | 25 | 0.05 |

$^a$Room temperature is 25° C.

In the present embodiment, in the pipetting module 10, a material of the pipette tip 100 includes polymethylmethacrylate (PMMA), polypropylene (PP), or polyethylene (PE), and a material of the pipette head 200 includes ceramics or glass. The foregoing materials are merely exemplary, and the material for actual applications are not limited to the foregoing materials. It can be seen that in Table 1, a coefficient of thermal expansion of PMMA is $88 \times 10^{-6}$ $k^{-1}$, a coefficient of thermal expansion of PP is $121 \times 10^{-6}$ $k^{-1}$, and a coefficient of thermal expansion of PE is $200 \times 10^{-6}$ $k^{-1}$. Herein, when a temperature difference of PMMA reaches 56.81° C., a dimensional difference may reach 0.05 mm, when a temperature difference of PP reaches 41.32° C., a dimensional difference may reach 0.05 mm, and when a temperature difference of PE reaches 25° C., a dimensional difference may reach 0.05 mm. Accordingly, PMMA and ceramics (with a coefficient of thermal expansion of $8 \times 10^{-6}$ $k^{-1}$) are taken as examples for description. When the connecting portion 120 of the pipette tip 100 made of PMMA with a relatively high coefficient of thermal expansion is sleeved on the protruding portion 220 of the pipette head 200 made of ceramics with a relatively low coefficient of thermal expansion, a volume of the connecting portion 120 may contract and deform as affected by temperature differences by means of temperature decrease, and that an appearance dimension of the connecting portion 120 is reduced, and the connecting portion 120 is tightly fitted to the pipette head 200. In another aspect, the volume of the connecting portion 120 may expand and deform by means of temperature increase, such that the appearance dimension of the connecting portion 120 is increased, and the connecting portion 120 is thus detached from the pipette head 200. Abrasion and deterioration of the pipette head 200 are thereby reduced, as such, the pipette head 200 has prolonged service life and requires less number of repairs nor less repair time. Furthermore, in the present embodiment, the dimension difference of the deformed pipette tip 100 may exceed a range of dimensional tolerance between 0.01 mm and 0.05 mm, and thus the pipette tip 100 is not affected by the dimensional tolerance generated in the process and may thus be effectively tightly fitted to or combined with.

Referring to FIG. 2, in the present embodiment, the connecting portion 120 of the pipette tip 100 is sleeved on the protruding portion 220 of the pipette head 200 and is overlapped with the protruding portion 220, as such, a shape of the connecting portion 120 is disposed corresponding to a shape of the protruding portion 220. Specifically, referring to FIG. 2, the protruding portion 220 is disposed on the base portion 210 in a perpendicular manner. The shape of the connecting portion 120 sleeved on the protruding portion 220 substantially corresponds to the shape of the protruding portion 220, and the connecting portion 120 is also perpendicular to the base portion 210. In other words, in the present embodiment, diameters of any portions of the connecting portion 120 are identical, and diameters of any portions of the protruding portion 220 are identical as well. Nevertheless, the invention is not limited thereto.

Further, in a preferred embodiment, a specific value of length ratio of the connecting portion 120 to the pipette tip 100 falls between 0.05 and 0.15. A length ratio of the connecting portion 120 may be defined as a range in which the pipette tip 100 is sleeved on the protruding portion 220 of the pipette head 200. When the specific value of length ratio of the connecting portion 120 to the pipette tip 100 is less than 0.05, tightness between the pipette tip 100 and the pipette head 200 may be less favorable. When the specific value of length ratio of the connecting portion 120 to the pipette tip 100 is greater than 0.15, reagent may be in contact with the pipette head 200 easily, and moreover, the pipette tip 100 may not be detached from the pipette head 200 easily during thermal expansion.

In addition, an appearance of the pipette tip 100 of the present embodiment may be similar to an appearance of a conventional pipette tip. Specifically, the pipette tip 100 may have a structure with a diameter descending gradually to a predetermined dimension at an end in a direction away from the connecting portion 120. In other words, the pipette tip 100 may have the structure which decreases gradually to the predetermined dimension and then stops decreasing afterwards at the end away from the connecting portion 120, and a tip is thereby formed.

Referring to FIG. 2, an appearance of the pipette head 200 of the present embodiment may be similar to an appearance of a conventional pipette head. Specifically, a diameter of the protruding portion 220 is less than a diameter of the base portion 210. In other words, an area of the protruding portion 220 in a top view is less than an area of the base portion 210 in a top view. Besides, in the present embodiment, the pipetting module 10 further includes a sensor 240, and the sensor 240 is disposed on the pipette head 200. FIG. 2 schematically illustrates that the sensor 240 is located on the base portion 210, but the invention is not limited thereto. In other embodiments (not shown), the sensor 240 may also be located in the protruding portion 220, as long as the sensor 240 is located on the pipette head 200 such that tightness between the pipette tip 100 and the pipette head 200 are detected.

Specifically, the sensor 240 is a temperature sensor or a pressure sensor and can be used to detect whether the pipette tip 100 is connected to the pipette head 200. When the sensor 240 is a temperature sensor, as the second coefficient of thermal expansion CT2 of the pipette tip 100 is greater than the first coefficient of thermal expansion CT1 of the pipette head 200, when a temperature of the pipette tip 100 reaches a predetermined temperature, the sensor 240 may thereby be used to determine whether the pipette tip 100 is already tightly fitted to the pipette head 200 or is detached from the pipette head 200. Similarly, when the sensor 240 is a pressure sensor, the sensor 240 may be used to determine whether the pipette tip 100 is tightly fitted to the pipette head 200 or is detached from the pipette head 200 according to pressure.

Next, referring to FIG. 1 and FIG. 3 together, the pipette tip pre-cooling station 30 of the present embodiment includes a tray 300 and a cooling device 320. The tray 300 may be a conventional tray used to carry the pipette tip, and the tray 300 includes a carrying plane 310 and at least one holes 312. In the embodiment, the at least one holes 312 includes a plurality of holes 312. Each of the holes 312 is disposed on the carrying plane 310, and the holes 312 are arranged in rows and columns on the supporting plane 310. Each of the holes 312 is adapted to carry the respective pipette tip 100 and the pipette head 200 combined. Note that merely two trays 300 are schematically illustrated in FIG. 3, but the invention is not limited thereto. The pipette tip pre-cooling station 30 may include one tray 300 or two or more trays 300 in other embodiments that are not shown.

Referring to FIG. 3, the cooling device 320 of the present embodiment is disposed in the pipette tip pre-cooling station 30. The cooling device 320 may be, for example, a water-cooling device in which temperatures of the tray 310 and the pipette tip 100 in the pipette tip pre-cooling station 30 may be rapidly reduced. As such, a temperature difference range is generated between the pipette tip pre-cooling station 30 and the reagent drawing station 40, the oscillation reaction station 50, and the pipette tip recycling station 60 of the automatic pipetting apparatus 1. The temperature difference range allows the pipette tip 100 to be tightly fitted onto the pipette head 200 (not shown) due to cooling and contraction. Specifically, in the present embodiment, the temperature difference range between the pipette tip pre-cooling station 30 and the reagent drawing station 40 or the oscillation reaction station 50 falls between 25° C. and 57° C.

To be more specifically, referring to FIG. 1 and FIG. 3 together, the pipette tip 100 is adapted to be combined with the pipette head 200 in the pipette tip pre-cooling station 30. After being combined, the pipette tip 100 together with the pipette head 200 form the pipetting module 10 (not shown) and are moved to the reagent drawing station 40 and the oscillation reaction station 50 together through the movement mechanism MA of the movable pipetting mechanism 20, and the pipette tip 100 is disengaged from the pipette head 200 at the pipette tip recycling station 60. Note that the tray 300, the pipette tip 100, and a freezing module 320 in the pipette tip pre-cooling station 30 are merely schematically illustrated and enlarged in FIG. 3 for reference only, and actual numbers, dimension ratios, and positional relationship thereof are not similar to those shown in FIG. 3.

Referring to FIG. 1 again, the reagent drawing station 40 of the present embodiment includes a groove 400. Specifically, a number of the groove 400 may be one or plural, and a plurality of the grooves 400 are arranged in a plurality of rows and columns in the reagent drawing station 40. Each of the grooves 400 is adapted to carry reagent (not shown), and the reagent may be a compound for reaction or solution such as water. In the present embodiment, the movable pipetting mechanism 20 with the pipette tip 100 are moved together to the reagent drawing station 40 and then are used to draw reagent, so as to perform a function of reagent movement.

Referring to FIG. 1, the oscillation reaction station 50 of the present embodiment includes a reaction test tube 500. Specifically, a number of the reaction test tube 500 may be one or plural, and the reaction test tubes 500 are arranged in a plurality of rows and columns in the oscillation reaction station 50. Specifically, the reaction test tubes 500, the grooves 400, and the holes 312 may be disposed corresponding to one another and form an array composed of rows and columns, but the invention is not limited thereto. Each of the reaction test tubes 500 is adapted to carry a sample to be tested or a compound to be reacted (not shown). After the movable pipetting mechanism 20 with the pipette tip 100 are moved together to the oscillation reaction station 50, the reagent (not shown) to be drawn in the reagent drawing station 40 is removed into the reaction test tube 500 for performing reaction. Furthermore, the oscillation reaction station 50 may further include an oscillation device (not shown). The oscillation device may be a motor shaker or a sonicator adapted to provide a physical vibration when the reagent reacts with the sample, so as to enhance uniformity of mixing and efficiency of reacting. Nevertheless, the invention is not limited thereto. The oscillation reaction station 50 may not have to include the oscillation device as well, as long as the reagent and the sample may be evenly mixed and reacted.

Next, referring to FIG. 1 and FIG. 4 together, the pipette tip recycling station 60 of the present embodiment includes an upper pre-heating station 620 and a lower waste station 640. The upper pre-heating station 620 includes a heating module 622. Specifically, the upper pre-heating station 620 is located above the lower waste station 640, and a top view area of the upper pre-heating station 620 is less than a top view area of the lower waste station 640. That is to say, the upper pre-heating station 620 is located within a range of the lower waste station 640. In addition, a periphery of the lower waste station 640 of the present embodiment is aligned with a periphery of the pipette tip recycling station 60 (see FIG. 1 and FIG. 4), and an area of the lower waste station 640 and an area of the pipette tip recycling station 60 are substantially identical. Nevertheless, the invention is not limited thereto. The area of the lower waste station 640 may also be less than the area of the pipette tip recycling station 60, and an area of the upper pre-heating station 620 may also be equal to the area of the lower waste station 640 (not shown in FIG. 1 and FIG. 4), as long as the pipette tip 100 can automatically fall off and enters the lower waste station 640 by utilizing the pre-heating mean of the upper pre-heating station 620.

Specifically, the heating module 622 is disposed in the upper pre-heating station 620. The heating module 622 may be a heat generation element such as an electric heating tube, an electric heating leaf, or a heating tube capable of rapidly increasing temperatures of the upper pre-heating station 620 in the pipette tip recycling station 60 and the pipette tip 100. As such, a temperature difference range is generated between the pipette tip recycling station 60 and the reagent drawing station 40 and the oscillation reaction station 50 of the automatic pipetting apparatus 1. The temperature difference range allows the pipette tip 100 to be detached from the pipette head 200 as affected by thermal expansion. Specifically, in the present embodiment, the temperature difference range between the pipette tip recycling station 60 and the reagent drawing station 40 or the oscillation reaction station 50 falls between 25° C. and 57° C. Next, the pipette tip 100 is detached and then falls into the lower waste station 640 located below the upper pre-heating station 620, and recycling is thus completed.

Besides, the upper pre-heating station 620 of the present embodiment further includes an infrared sensor 624. The infrared sensor 624 is connected to the upper pre-heating station 620 through a connection side wall 623 and is located between the upper pre-heating station 620 and the lower waste station 640. The infrared sensor 624 may detect whether the pipette tip 100 is disengaged from the pipette head 200. The principle of the infrared sensor 624 is similar to that of a conventional dynamic sensor. When being disengaged from the pipette head 200 and falling off to the lower waste station 640 from the upper pre-heating station 620, the pipette tip 100 passes through a detection range of the infrared sensor 624 and thus triggers a dynamic detection of the infrared sensor 624. As such, the infrared sensor 624 may be used to determine whether the pipette tip 100 is disengaged from the pipette head 200, and one time of detection is thus completed. Next, the automatic pipetting apparatus 1 may continue to move the movable pipetting mechanism 20 to the pipette tip pre-cooling station 30 for the next combination between the pipette tip 100 and the pipette head 200. Note that the upper pre-heating station 620 and the lower waste station 640 in the pipette tip recycling station 60, the pipette tip 100, the heating module 622, and the infrared sensor 624 are merely schematically and simply illustrated and enlarged in FIG. 4 for reference only, and actual numbers, dimension ratios, and positional relationship thereof are not similar to those shown in FIG. 4.

In the present embodiment, the temperature difference range is provided between the pipette tip pre-cooling station 30 and the reagent drawing station 40 or the oscillation reaction station 50. In the embodiments listed, the temperature difference range between the pipette tip pre-cooling station 30 and the reagent drawing station 40 or the oscillation reaction station 50 falls between 25° C. and 57° C. Nevertheless, the invention is not limited thereto. Therefore, the pipette tip 100 may be combined with the pipette head 200 in the pipette tip pre-cooling station 30 and achieves tightness through thermal expansion and contraction. Similarly, the temperature difference range is provided between the pipette tip recycling station 60 and the reagent drawing station 40 or the oscillation reaction station 50. Moreover, the temperature difference range falls between 25° C. and 57° C. in the embodiments listed. Therefore, the pipette tip 100 may be detached from the pipette head 200 in the pipette tip recycling station 60 and falls off by itself as affected by thermal expansion and contraction, and that recycling is completed. As such, the pipette head 200 of the pipetting module 10 may be engaged with the pipette tip 100 whether or not to employ the structure such as the groove or the O-ring structure. Moreover, tightness or detachment effect of the pipette tip 100 and the pipette head 200 may be achieved without being worn out or deteriorated of the bonded structure. In other words, the automatic pipetting apparatus of the present embodiment requires less repair time, lower costs and greater inspection efficiency.

Note that the pipette tip 100 is not limited to be a one-time use supply by the invention. The pipette tip 100 may be discarded or recycled according to the nature and goals of the experiment after being recycled in the lower waste station 640. In other words, the pipette tip 100 may be a piece of equipment which can be used for multiple times and thus is repeatedly re-used after being recycled and washed after use.

It should be noted that the reference numerals and a part of the contents in the previous embodiment are used in the following embodiments, in which identical reference numerals indicate identical or similar components, and repeated description of the same technical contents is omitted. Please refer to the descriptions of the previous embodiment for the omitted contents, which will not be repeated hereinafter.

Figure 5:
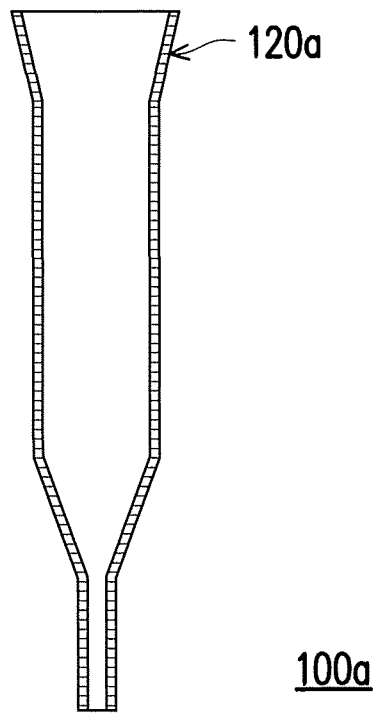
FIG. 5 is a schematic cross-sectional view illustrating a pipette tip of a pipetting module according to another embodiment of the invention.
Figure 6A:
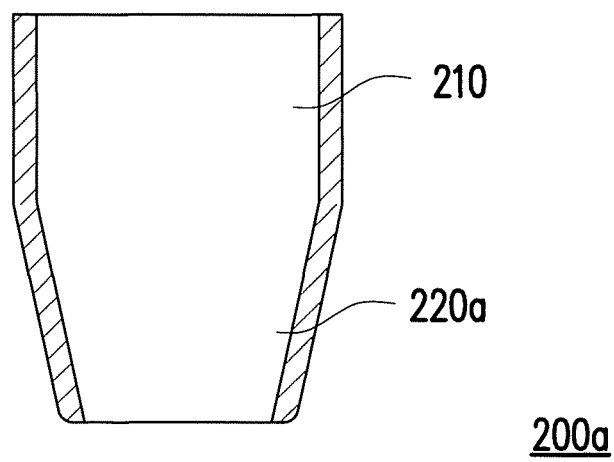
FIG. 6A is a schematic cross-sectional view illustrating a pipette head of a pipetting module according to another embodiment of the invention.

FIG. 5 is a schematic cross-sectional view illustrating a pipette tip of a pipetting module according to another embodiment of the invention. FIG. 6A is a schematic cross-sectional view illustrating a pipette head of a pipetting module according to another embodiment of the invention. Referring to FIG. 2, FIG. 5, and FIG. 6A together, in the present embodiment, a pipette tip 100a and a pipette head 200a are similar to the pipette tip 100 and the pipette head 200 in FIG. 2, but a difference therebetween is that a shape of a connecting portion 120a of the pipette tip 100a of the present embodiment is disposed corresponding to a shape of a protruding portion 220a of the pipette head 200a, and an inclined angle is provided between the protruding portion 220a and the base portion 210. In other words, the protruding portion 220a is not perpendicular to the base portion 210 and thus has a diameter descending gradually in a direction from close to the base portion 210 to away from the base station 210. An inclined surface has greater surface areas compared to a surface which is not inclined. When the connecting portion 120a is combined with the protruding portion 220a (not shown), greater contact areas between the two surface areas are obtained and greater frictional force is thus provided. Moreover, when the connecting portion 120a is being deformed by means of temperature decreases, and greater contraction areas are thus provided, which is advantageous for the pipette tip 100a to be tightly fitted to the pipette head 200a. On the other hand, the connecting portion 120 may also be deformed by means of temperature increases, and greater expansion areas are thus provided, which is advantageous for the pipette tip 100a to be detached from the pipette head 200a.

Figure 6B:
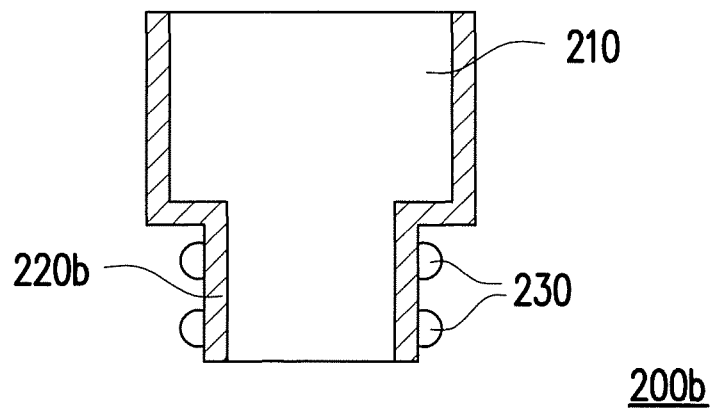
FIG. 6B is a schematic cross-sectional view illustrating a pipette head of a pipetting module according to another embodiment of the invention.

FIG. 6B is a schematic cross-sectional view illustrating a pipette head of a pipetting module according to another embodiment of the invention. Referring to both FIG. 2 and FIG. 6B together, in the present embodiment, a pipette head 200b is similar to the pipette head 200 in FIG. 2, but a difference therebetween is that a surface of a protruding portion 220b of the pipette head 200b of the present embodiment has a plurality of microstructures 230, wherein the microstructures 230 are disposed on the surface of the protruding portion 220b to form an uneven surface. In other embodiments (not shown), an inner surface of a connecting portion 120b of the pipette tip 100b may further be disposed corresponding to an outer surface of the protruding portion 220b of the pipette head 200b and the microstructures 230. By the means of deposing the microstructures 230, the surface areas of the protruding portions 220b are increased, such that, the surface roughness thereof is increased, and that the frictional force is enhanced when the protruding portion 220b and the pipette tip 100b are combined (not shown). Moreover, the connecting portion 120b is disposed corresponding to the outer surface of the protruding portion 220b and the microstructures 230, which is advantageous for the pipette tip 100b and the pipette head 200b to be tightly fitted, and detachment is thus prevented.

Figure 6C:
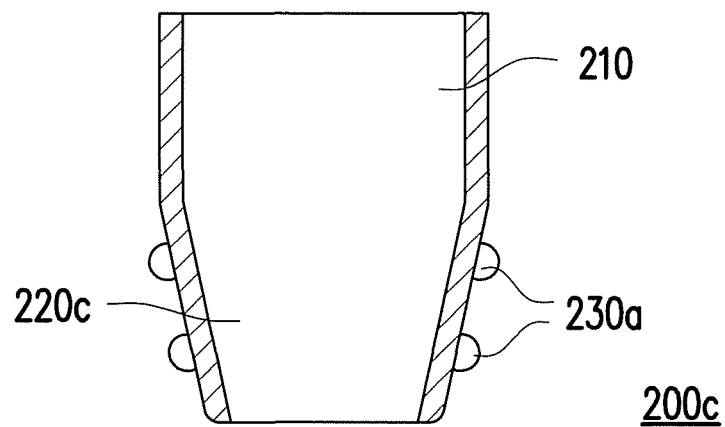
FIG. 6C is a schematic cross-sectional view illustrating a pipette head of a pipetting module according to another embodiment of the invention.

FIG. 6C is a schematic cross-sectional view illustrating a pipette head of a pipetting module according to another embodiment of the invention. Referring to FIG. 5, FIG. 6A, and FIG. 6C simultaneously, in the present embodiment, a pipette head 200c is similar to the pipette head 200a in FIG. 6A, but a difference therebetween is that a surface of a protruding portion 220c of the pipette head 200c of the present embodiment has a plurality of microstructures 230a, wherein the microstructures 230a are disposed on the surface of the protruding portion 220c to form an uneven surface. In other embodiments (not shown), a shape and an inner surface of a connecting portion 120c of the pipette tip 100c may further be disposed corresponding to a shape and an outer surface of the protruding portion 220c of the pipette head 200c and the microstructures 230a. A surface area of an inclined surface of the protruding portion 220c is further increased compared to that of the protruding portion 220a in FIG. 6A due to the microstructures 230a, and surface roughness of the protruding portion 220c is thereby increased as well, as such, the frictional force is enhanced when the protruding portion 220c is combined with the pipette tip 100c in FIG. 5 (not shown). Moreover, the connecting portion 120c is disposed corresponding to the shape and the outer surface of the protruding portion 220c and the microstructures 230, which is advantageous for the pipette tip 100c and the pipette head 200c to be tightly fitted, and detachment is thus prevented.

Note that the invention is not intended to limit structural types of the microstructures 230 or microstructures 230a. As long as an uneven surface is defined through the microstructures 230 or the microstructures 230a and the surface of the protruding portion 220b or the protruding portion 220c, it will be within the scope of the invention seeking to protect. Based on the aforementioned design principle, a schematic cross-sectional shape of the microstructure 230 or the microstructure 230a may also be a polygon or other irregular shapes in other embodiments that are not shown in addition to an arc shape.

In view of the foregoing, the automatic pipetting apparatus provided by the embodiments of the invention has the pipetting module formed by the pipette tip being sleeved on the pipette head, wherein the pipette head has the first coefficient of thermal expansion and the connecting portion of the pipette tip has the second coefficient of thermal expansion. The second coefficient of thermal expansion is greater than the first coefficient of thermal expansion. As such, the dimension of the connecting portion after being deformed may be greater than that of the pipette head after being deformed by means of temperature decrease or heating. The dimension change ranges between 0.01 mm and 0.05 mm. In this way, whether or not the groove or the O-ring structure is employed by the pipetting module, the pipette tip is tightly fitted to the pipette head through the dimension change caused by cooling and contraction. Alternatively, the pipette tip is detached from the pipette head through the dimension change caused by thermal expansion. In another aspect, in the automatic pipetting apparatus provided by the embodiments of the invention, the pipette head is tightly fitted to the pipette tip without adopting the groove or the O-ring structure. Therefore, the pipette head is less susceptible to be worn out and deteriorated, and the requirements for cost reduction, repair time reduction, and high inspection efficiency are satisfied.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pipetting module, comprising:
   a pipette head having a first coefficient of thermal expansion; and
   a pipette tip adapted to be sleeved on the pipette head and having a second coefficient of thermal expansion,
   wherein the second coefficient of thermal expansion of the pipette tip is greater than the first coefficient of thermal expansion of the pipette head, when the pipette tip with the second coefficient of thermal expansion is sleeved on the pipette head with the first coefficient of thermal expansion, a volume of the pipette tip contracts by temperature decrease such that the pipette tip is tightly fitted to the pipette head, or the volume of the pipette tip expands by temperature increase such that the pipette tip is detached from the pipette head.

2. The pipetting module as claimed in claim 1, wherein a material of the pipette tip comprises polymethylmethacrylate, polypropylene, or polyethylene, and a material of the pipette head comprises ceramics or glass.

3. The pipetting module as claimed in claim 1, further comprising:
a sensor disposed on the pipette head, the sensor being a temperature sensor or a pressure sensor.

4. An automatic pipetting apparatus, comprising:
a pipette tip pre-cooling station, comprising a cooling device;
a pipette tip recycling station;
a movable pipetting mechanism, comprising:
a pipette head, the pipette head having a first coefficient of thermal expansion; and
a movement mechanism, the pipette head being disposed on the movement mechanism, and the movement mechanism being adapted to move between the pipette tip pre-cooling station and the pipette tip recycling station; and
a pipette tip comprising a connecting portion, wherein the connecting portion is adapted to be sleeved on the pipette head and having a second coefficient of thermal expansion, wherein the second coefficient of thermal expansion of the pipette tip is greater than the first coefficient of thermal expansion of the pipette head, when the pipette tip with the second coefficient of thermal expansion is sleeved on the pipette head with the first coefficient of thermal expansion, a volume of the pipette tip contracts by temperature decrease such that the pipette tip is tightly fitted to the pipette head, or the volume of the pipette tip expands by temperature increase such that the pipette tip is detached from the pipette head.

5. The automatic pipetting apparatus as claimed in claim 4, wherein the pipette tip pre-cooling station comprises a tray, and the tray is adapted to carry the pipette tip.

6. The automatic pipetting apparatus as claimed in claim 4, wherein the pipette tip is adapted to be combined with the pipette head at the pipette tip pre-cooling station, to be moved together with the pipette head to the pipette tip recycling station, and to be detached from the pipette head.

7. The automatic pipetting apparatus as claimed in claim 4, wherein the pipette tip recycling station comprises an upper pre-heating station and a lower waste station, and the upper pre-heating station comprises a heating module.

8. The automatic pipetting apparatus as claimed in claim 5, wherein an upper pre-heating station comprises an infrared sensor.

9. The automatic pipetting apparatus as claimed in claim 4, wherein a material of a pipette tip structure comprises polymethylmethacrylate, polypropylene, or polyethylene, and a material of the pipette head comprises ceramics or glass.

10. The automatic pipetting apparatus as claimed in claim 4, wherein the movable pipetting mechanism further comprises:
a sensor disposed on the pipette head, the sensor being a temperature sensor or a pressure sensor.

* * * * *